June 19, 1951 — F. GREENBERG — 2,557,279
FILTERS FOR VACUUM CLEANERS
Filed Dec. 16, 1949
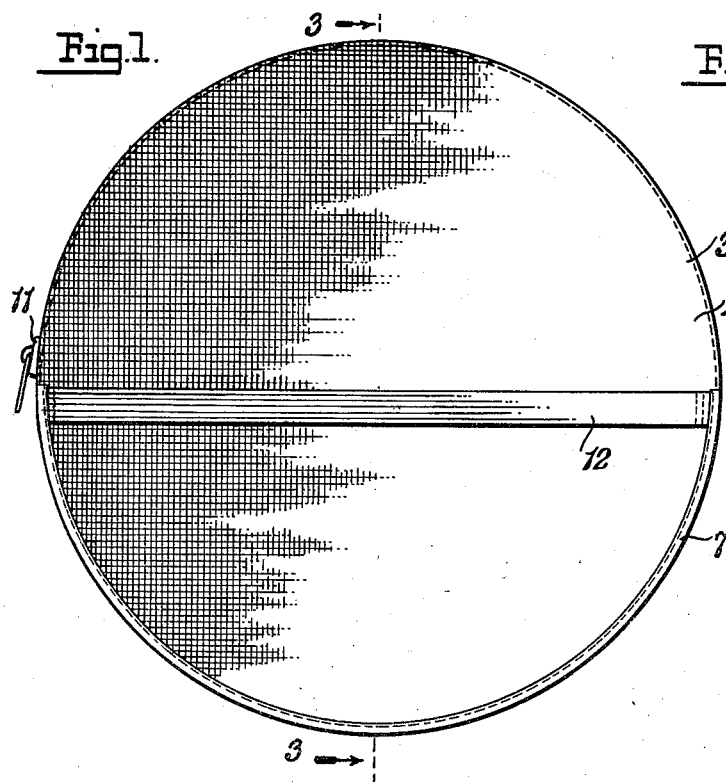
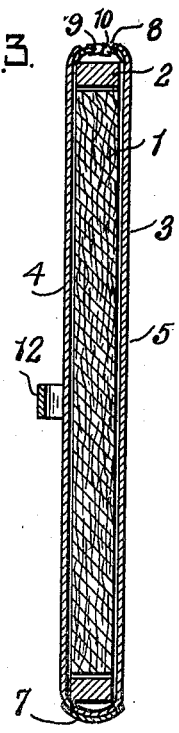
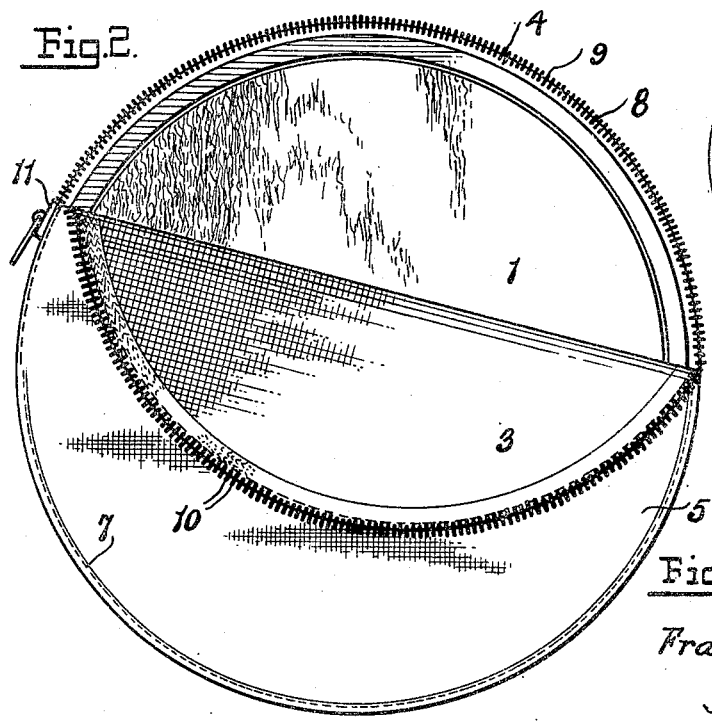
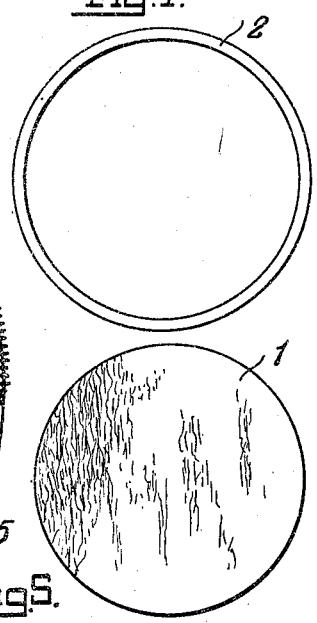
INVENTOR
Frank Greenberg
BY Harry Radzwisky
ATTORNEY Patented June 19, 1951

2,557,279

UNITED STATES PATENT OFFICE 2,557,279

FILTER FOR VACUUM CLEANERS

Frank Greenberg, New York, N. Y., assignor of one-half to Harry Malter, New York, N. Y.

Application December 16, 1949, Serial No. 133,409

1 Claim. (Cl. 183—45)

This invention relates to filters for use in vacuum cleaners and other devices, and has for its primary object the provision of an article of this character which can be cleaned conveniently and easily when it becomes dirty or dust-charged, and then restored to its position of use in the cleaner.

In most vacuum cleaners, and particularly in those of the cylinder type, the outlet or exhaust air blast passes through a filter before emergence into the room. Such filters are of a construction which does not permit of them being washed or otherwise cleansed and consequently when the same become dirty from the dust impinged against them by the exhaust blast, the entire filter must be replaced. This not only subjects the owner of the cleaner to filter-replacement charges, but very often when a new and clean filter is not at hand, the user of the cleaner will continue to use the cleaner indefinitely with a dirt-charged filter, thus not only greatly impairing the operation of the cleaner, but using the same in an insanitary and inefficient manner by forcing the exhaust blast through a dirty, dust-clogged filter. Since the purpose of these filters is to capture such dust as may be carried past the collection bag, and to prevent the dust from thus being blown into the room, it is apparent that a clean filter is not only desirable for sanitary purposes, but a clean filter results in a most efficient use of the vacuum cleaner. Hence it is highly desirable that a filter be provided which can be easily removed from the machine at any time and which can be subjected to washing and cleaning to completely remove the collected dust and dirt, and the cleansed filter quickly restored to working position in the vacuum cleaner.

It is thus an important object of the invention to provide such a filter, and one in which not only the filter as a whole can be washed or otherwise cleansed, but the several parts of the cleaner, such as the filter pad and fabric covering therefor, can be independently cleansed or inexpensively and quickly replaced when badly soiled or worn from lengthy use.

With these and other objects to be hereinafter set forth in view, I have devised the particular arrangement of parts hereinafter set forth, and more particularly pointed out in the claim appended hereto.

In the accompanying drawing, wherein an illustrative embodiment of the invention is disclosed, Fig. 1 is a face view of a filter constructed in accordance with the invention; Fig. 2 is a similar view, with the covering shown in partly open position to disclose the filter pad and the frame or shaping ring; Fig. 3 is a sectional view, taken on the line 3—3 of Fig. 1, looking in the direction of the arrows; Fig. 4 is a top plan view on a reduced scale, of the frame or shaping ring, and Fig. 5 is a top plan view of the filter pad.

The improved pad, as illustrated in the drawing, consists of three main elements, namely, the filter pad indicated at 1, the shaping ring or frame shown at 2, and the covering or enclosure shown at 3.

The ring or frame 2, while shown to be of circular form may be of any other suitable shape to conform to the seat against which it is placed, or to conform to the shape of the cylinder or passage across which it is disposed in the body or housing of the cleaner. The circular form of filter shown is that which is widely used in the cylindrical types of household vacuum cleaners in use at the present time. It will be apparent that the shape, size and form of the filter may be altered according to the type of cleaner in which the same is intended for use.

The ring or frame 2 may be composed of any non-corrosive metal, fibre, plastic or any other suitable stiff, and shape-retaining material and one which will not be materially affected by washing with water or by other cleansing treatments to which the filter may be subjected.

The filter pad shown at 1, is preferably composed of a fibrous material such as spun glass, or some other suitable filtering material and one which can be washed with water or other cleansing preparations without fear of disintegrating the pad. The pad must, of course, be air-pervious to permit of the passage of the air blast while collecting any dirt and dust borne thereby. The shape of the pad 1, is such that the same fits closely within the ring 2 and practically closes the circular space or area defined by said ring. When the pad is placed within the ring 2, the pad and ring are then inserted in the cover or outer fabric casing 3, which casing is thereupon closed by suitable closure means to enclose the pad and ring and complete the assembly of the filter, which is then ready for placement in the vacuum cleaner.

The cover or casing 3 is circular, in the form shown, to conform to the shape of the ring 2 and closely and evenly fit over the same. The covering may be composed of a suitable textile material, or of the sheet material known as "nylon," or any other fabric or sheet material of an air-pervious and readily washable nature.

The cover or casing 3 may be fabricated in any suitable manner such as by uniting the edges of two circular or disk-shaped fabric sections 4 and 5 by stitching and by the reinforcement of a tape or binding 7. It is to be noted that the permanent securement of the edge portions of the two disks 4 and 5 extends for only a portion of the marginal edges of these two disks, the remaining portions of the edges of the disks being unsecured and thus defining an opening 8 through which the ring 2 and its enclosed pad 1 can be inserted into the interior of the cover. The opening 8 is then closed by means of the slide fastener consisting of the fastener elements 9 on one edge of the disk 4 and the cooperating fastener elements 10 on the edge of the disk 5, or by any other suitable closure means. When the fastener is closed by the sliding movement of the operating member 11 of the fastener, the ring 2 and its pad 1 will then be completely enclosed within the cover 3.

The cover or casing 3 is of such shape and size as to snugly fit around the ring and be drawn rather taut across the same, so that the filter presents the aspect of a flat and smooth disk when the three parts thereof are assembled in the relationship described.

The pad 1 and the cover member 3 are composed of materials which are air-pervious and thus permit the passage of the air blast forced through them, while capturing the dirt and dust borne by the air. Both the pad 1 and cover member 3, as well as the ring 2 are composed of washable material so that when the pad becomes dirty or dust-charged, it can be readily cleansed by washing it. This can be done by holding it in the flow of water from a faucet or it can be washed in any other suitable way. Such washing does not necessarily require dismantling of the parts of the filter. On the other hand, if it is found expedient to wash the several parts of the filter separately, this can be readily done since by opening of the slide fastener and removing the ring and pad from within the cover, the pad can then be lifted out of the ring. The three parts, being thus separated, are easily washed or otherwise cleansed.

For those who prefer to insert a new filter pad rather than to wash or cleanse the dirty one, the replacement is simple. In such case, only the cover need be washed, and if made of "nylon" or some similar easily-washed material, the cover can be made fresh and clean by the simplest of washing steps. Since the cost of the filter pads is very low, the replacement of such pads is an economical step which can be pursued if washing of the pad is not desired.

It will thus be apparent that a filter has been provided which will be very-long-lasting; which can be washed or cleansed very readily and will thus be conducive to a sanitary use of the vacuum cleaner. To facilitate the placement of the filter within the cleaner and its easy removal therefrom, a fabric loop 12, extending across one face of the cover 3, may be provided.

While I have shown and described one embodiment of the invention, it is obvious that the same is not to be restricted thereto, but is broad enough to cover all structures coming within the scope of the annexed claim.

What I claim is:

A filter for vacuum cleaners comprising, a cover composed of two fabric disks permanently secured together along their edges for at least one-half of their diameter, slide fastener means for connecting together the remaining portion of the edges of said disks, the portions of the edges of the disk connected by the slide fastener means defining an edge opening between the disks, a rigid ring member closely fitting within the cover and being entrant between the fabric disks thereof by passage through the edge opening in the cover without requiring compression or distortion of the ring, a disk of air pervious and washable, filter material of a size to closely fit within the ring, and be maintained flatly by the ring while said ring is positioned within the cover, the cover, filter material and ring being readily separable for washing or cleansing.

FRANK GREENBERG.

REFERENCES CITED

The following references are of record in the file of this patent:

UNITED STATES PATENTS

| Number | Name | Date |
|---|---|---|
| 1,544,690 | Shurtleff | July 7, 1925 |
| 1,913,764 | Ljungquist | July 18, 1933 |
| 2,019,867 | Nelson | Nov. 5, 1935 |
| 2,057,568 | Gerard | Oct. 13, 1936 |
| 2,237,847 | Smith | Apr. 8, 1941 |

FOREIGN PATENTS

| Number | Country | Date |
|---|---|---|
| 100,443 | Sweden | Oct. 10, 1940 |